March 19, 1968  R. G. HINDMAN  3,373,570
METHOD AND APPARATUS FOR INSTALLING UNDERWATER PIPELINE
Filed Feb. 7, 1966  4 Sheets-Sheet 1

INVENTOR.
ROBERT G. HINDMAN,
BY
ATTORNEY.

March 19, 1968 R. G. HINDMAN 3,373,570
METHOD AND APPARATUS FOR INSTALLING UNDERWATER PIPELINE
Filed Feb. 7, 1966 4 Sheets-Sheet 2
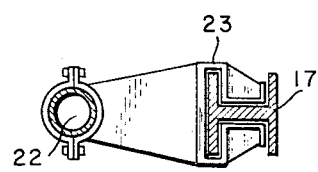
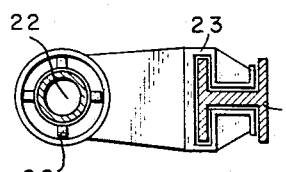
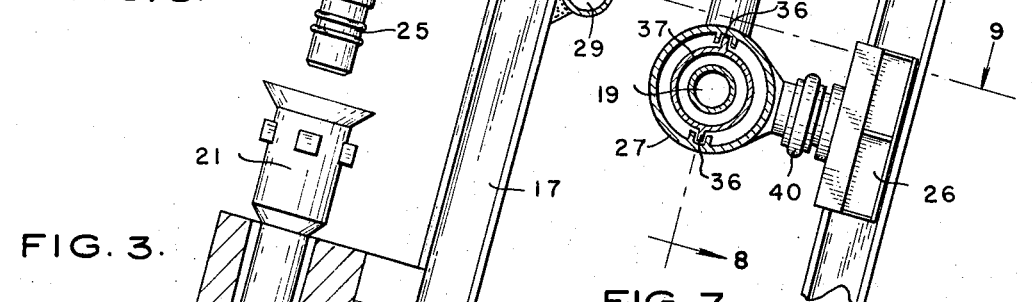
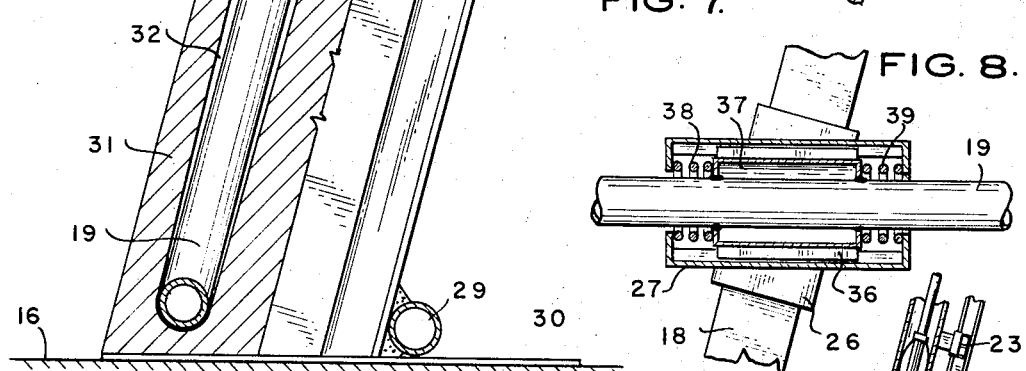
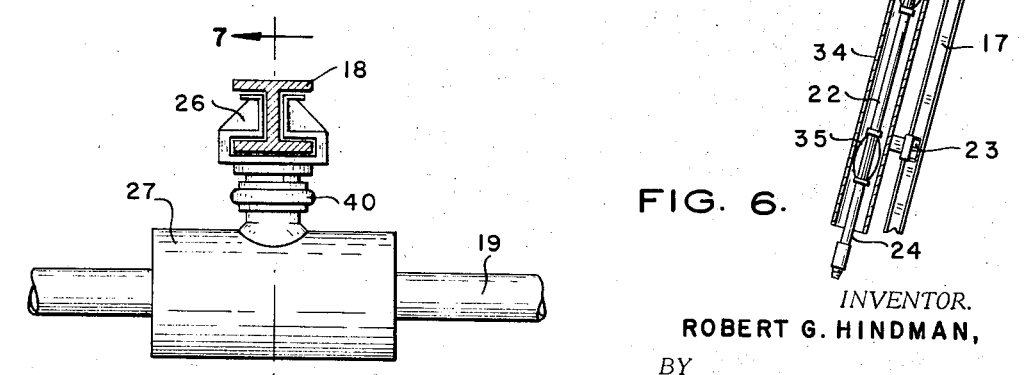
INVENTOR.
ROBERT G. HINDMAN,
BY
ATTORNEY.

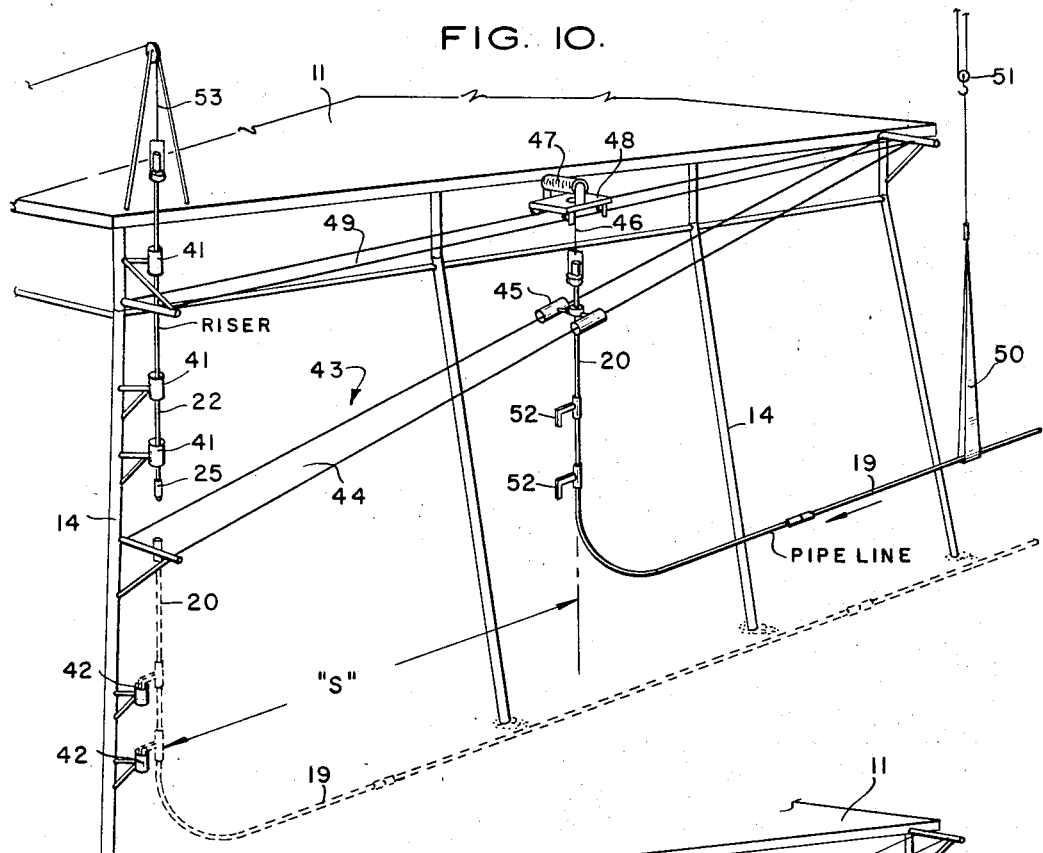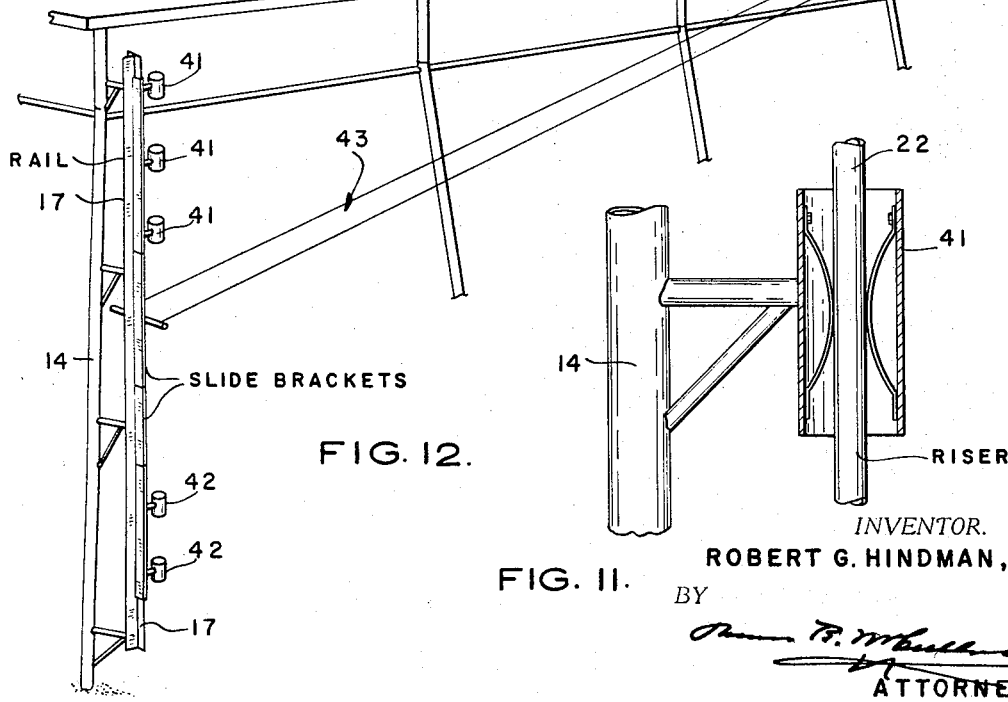

United States Patent Office 3,373,570
Patented Mar. 19, 1968

3,373,570
METHOD AND APPARATUS FOR INSTALLING UNDERWATER PIPELINE
Robert G. Hindman, New Orleans, La., assignor to Esso Production Research Company
Filed Feb. 7, 1966, Ser. No. 525,411
13 Claims. (Cl. 61—72.3)

ABSTRACT OF THE DISCLOSURE

Slack in laying underwater pipelines in deep water is compensated for by having the pipeline riser and the pipeline extend in two different directions which converge for guidingly lowering the riser and the pipeline from a floating or fixed support in the deep water.

The present invention is directed to method and apparatus for installing an underwater pipeline. More particularly, the invention is concerned with the installation of an underwater pipeline on a support arranged at least at water level in deep water. In its more specific aspects, the invention is concerned with installing an underwater pipeline on a well platform in deep water to compensate for slack in the pipeline.

The present invention may be briefly described and summarized as a method for installing an underwater pipeline on a support arranged fixedly or floatingly at least at water level in deep water wherein a pipeline having a free end extending to a point at least adjacent said support is lowered in said water in a first direction; a pipeline riser having a lower free end is lowered from said support in a second direction until its lower free end is adjacent the free end of the pipeline. The first and second directions converge at a common point at least when extended. The free ends of the pipeline and pipeline riser are connected to form a fluid passageway through the pipeline wherein any advance or slack in the pipeline resulting from lowering the pipeline in the body of water is compensated.

The invention is also concerned with apparatus for installing a pipeline on a support in deep water which comprises in combination a support member arranged in deep water. The support member may be a platform which is supported on members extending from water bottom to a point above water surface. The support member may also be a vessel which is floatingly arranged in the body of water. A pipeline extends with a free end to a point at least adjacent the support member, and the support member is provided with first means for lowering the pipeline in the water. The support member is also provided with second means for lowering a pipeline riser having a free lower end from the support member in a second direction. The first and second lowering means are arranged to converge at a common point at least when the directions thereof are extended. Means are also provided for connecting the free ends of the pipeline and pipeline riser.

The present invention contemplates that the pipeline and pipeline riser may be lowered guidingly either to water bottom or to a point adjacent water bottom, or to a selected point. In accordance with the present invention, the pipeline with its free end is lowered downwardly in the water to bring the free end adjacent the free end of the pipeline riser, which is also lowered in the body of water in a direction different from the direction in which the pipeline is lowered. By virtue of lowering the pipeline and pipeline riser in different directions, it is possible, in accordance with the present invention, to compensate for slack which ordinarily would occur in the pipeline by virtue of lowering it from water surface or from a point below water surface to a greater depth or to water bottom.

In accordance with the present invention, the pipeline and pipeline riser are guidingly lowered by means of guide means, which may be rails or other guide means arranged on the support or platform.

The present invention is quite important and useful in that it allows the laying of pipelines to offshore platforms and vessels while compensating for slack which would normally occur in the pipeline by virtue of lowering it from the water surface or from a point below water surface to a lower depth such as water bottom.

The present invention will be further illustrated by reference to:

FIG. 1, which is a partial perspective view of an offshore platform with guide means arranged thereon;

FIG. 3 is a partial sectional view in detail of one of the rails and the guide means of FIGS. 1 and 2;

FIG. 4 is a view of FIG. 3 taken along the line 4—4 of FIG. 3;

FIG. 5 is a view of FIG. 4 taken along the line 5—5 of FIG. 3;

FIG. 6 is an alternate embodiment of FIG. 3;

FIG. 7 is a more detailed view of the other guide means of FIGS. 1 and 2;

FIG. 8 is a view taken along the line 8—8 of FIG. 7;

FIG. 9 is a view taken along the line 9—9 of FIG. 7;

FIG. 10 illustrates a platform similar to that shown in FIG. 1 with a modified guide system;

FIG. 11 is a partial sectional view of a portion of the pipeline riser guide means of FIG. 10;

FIG. 12 is a further modified system similar to that of FIG. 10;

Figure 1:
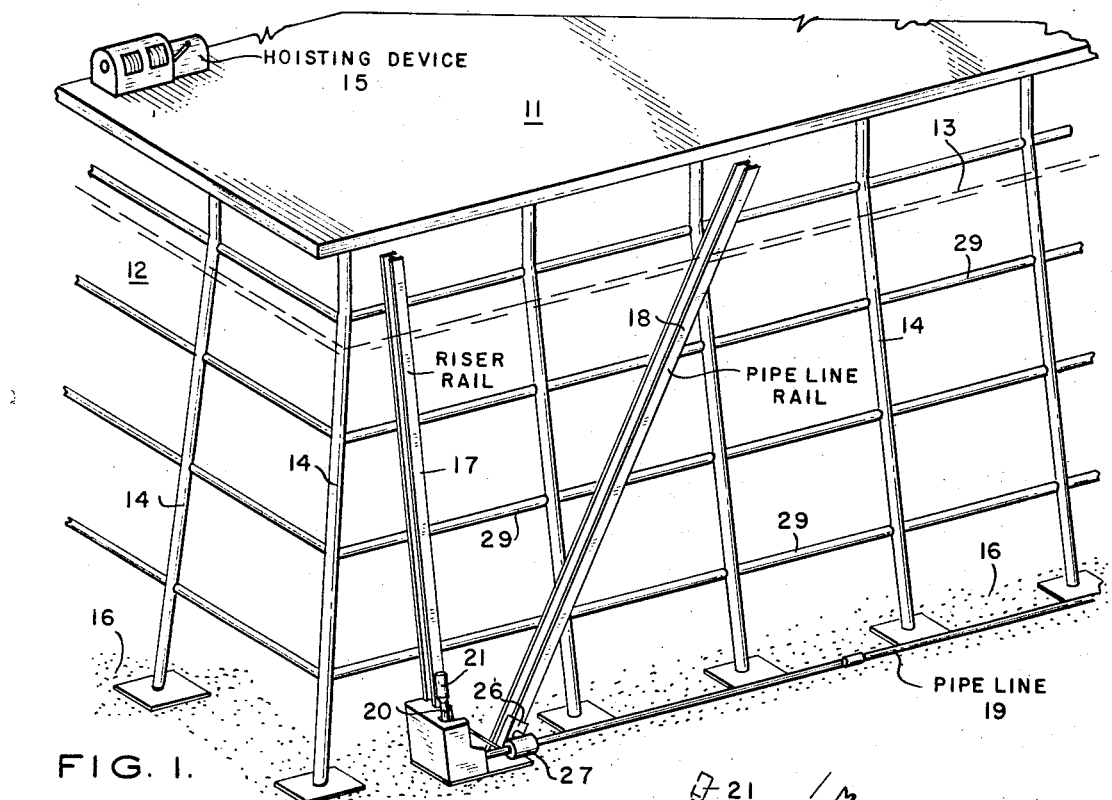
Figure 2:
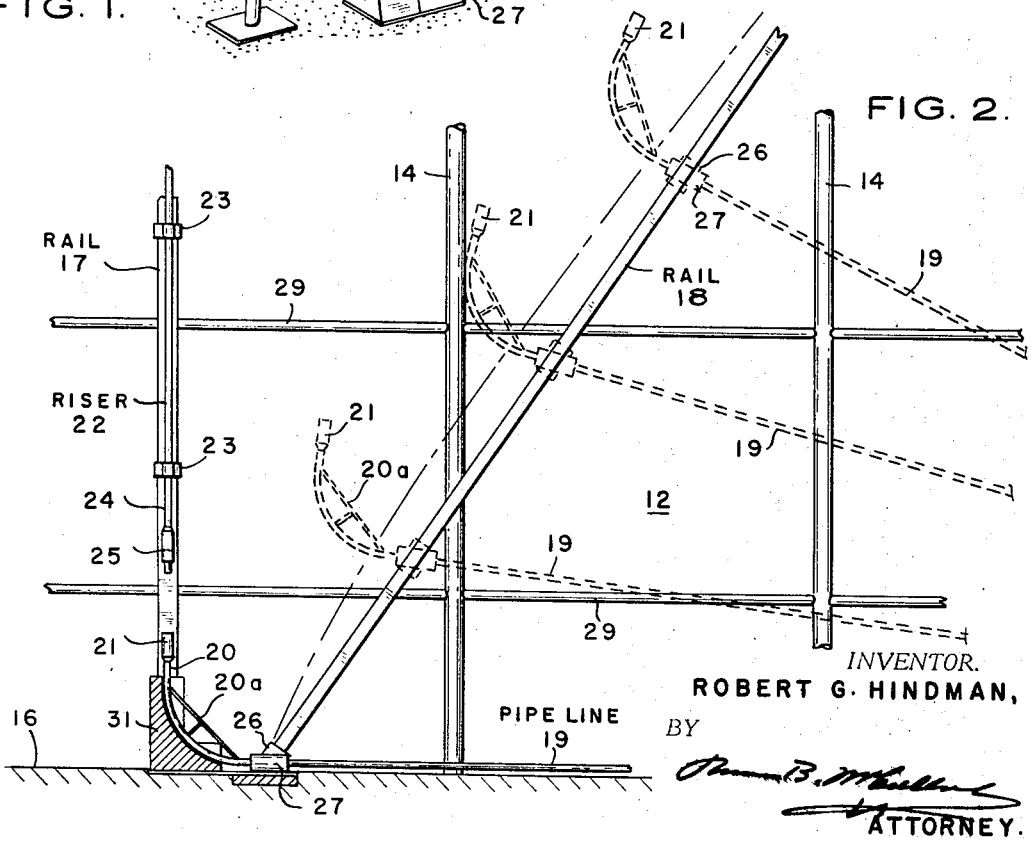
FIG. 2 is a partial view, in more detail, of the guide means of FIG. 1 illustrating the lowering of the pipeline.

Referring now to the drawings where identical numerals will designate identical parts, and particularly to FIGS. 1 and 2, numeral 11 designates an offshore platform arranged in a body of water 12 wherein the platform 11 is arranged above the water surface 13 and is supported on water bottom by support members 14. In the interest of clarity, only a portion of the platform 11 is illustrated. The platform 11 is provided with hoisting machinery designated by the numeral 15 and other machinery which may be necessary in laying the pipeline or for drilling an oil or gas well.

Extending from above the water surface 13 and to water bottom 16 is a first rail or guide member 17 which is battered in one direction. A second rail or guide member 18 also extends from above the water level 13 to water bottom 16 and the guide rail 18 is battered in two directions. A pipeline 19 is shown on water bottom to which it has been lowered, as will be described further. The pipeline 19 has a free end 20 which terminates in a connecting means 21.

Referring now to FIG. 2, the rail member 17 has a pipeline riser 22 carried downwardly on it by means of slides or carrier members 23. The lower end of the pipeline riser 22 terminates at its free end 24 in a pin-connecting means 25 which is adapted to matingly connect with the connector 21 of the free end 20 of the pipeline 19.

FIG. 2 illustrates a stepwise lowering of the pipeline 19 on the rail 18. It will be noted that the free end 20 of the pipeline 19 is braced by brace member 20a and that the pipeline is slidably arranged on the rail 18 by a slide member 26 which is connected by means of a swivel or hinge connection to a slide sleeve 27, which will be described in more detail hereinafter. FIG. 2 shows the positions that the free end of the pipeline 19 assumes as it is guidingly lowered on the rail 18 until the free end 20 is adjacent the free end 24 of the pipeline riser 22.

Referring now to FIGS. 3, 4, and 5, the rail 17 is provided with slides or carriers 23 in which the pipeline riser 22 is guidingly lowered. It is to be noted that the lowermost slide 23 has the pipeline riser arranged therein with spring centralizers 28. The centralizer springs 28 maintain sufficient friction to prevent vertical movement relative to the slide 23 but afford sufficient flexibility so as to allow easy mating of the two connecters 25 and 21. As shown in FIG. 4, the upper slides 23 are securely bolted about the riser 22. The rail 17 is suitably attached to cross-girts 29 which form part of the platform 11. A mud mat 30 may be arranged at water bottom 16. It is to be noted that a seat 31 having a slot 32 to receive the curved free end 20 of the pipeline 19 is provided to locate it for connection with the free end 24 of the pipeline riser 22. It is also to be noted that the free end 24 of the pipeline riser 22 shown in FIG. 4 is provided with O-ring seals 33 for sealingly engaging within the connecter 21. A threaded pin and box arrangement may be used if desired.

An alternate slide arrangement is shown in FIG. 6 wherein the slides 23 are connected to a casing 34 in which the pipeline riser 22 is arranged and is centrally located therein by means of centralizer 35. The casing may be carried downwardly on the slides 23 until the free end 25 is brought down to the free end 20 of the pipeline 19 in seat 31.

Referring now to FIGS. 7-9, inclusive, the rail 18 of FIG. 2 will now be described in detail along with the slide 26 and the sleeve 27. It will be noted that the free end 20 of the pipeline 19 is arranged in the sleeve 27 and is centrally arranged therein by centralizers 36 which are formed on a slide sleeve 37 which is positioned within the sleeve 27 by springs 38 and 39 bearing against each end of the sleeve 27. The springs 38 and 39 provide flexibility between the pipeline 19 and the rail slide 26.

The sleeve 27 is connected to the carrier slide 26 by means of a swivel or hinge 40, as shown more clearly in FIGS. 7 and 9.

Referring now to FIG. 10, the riser guide means consists of a plurality of vertically aligned, spaced-apart sleeve members 41 which are attached to the corner girt 14 of platform 11. As shown in FIG. 11, the sleeve members 41 are provided with centralizer springs 41a which engage and center the riser 22 in the sleeves. A pair of hook receiver sleeves 42 are attached to the lower portion of girt 14. Sleeves 42 are adapted to receive hook members 52 which are attached to the free end 20 of pipeline 19.

A wireline advance system 43 is attached to the platform 11 as shown and extends the length thereof. The advance system 43 includes guide cables 44 on which is positioned a sliding yoke 45, and track cables 49 which support and carry a cable car 48 provided with a reel 47. As shown, the free end 20 of pipeline 19 is connected to the reel 47 by a cable 46. The pipeline is adjustably supported by the reel 47 and line 46 and extends through the sliding yoke 45. The pipeline 19 is also supported from the platform 11 by a sling 50 attached to a hoisting mechanism (not shown) through a block 51. The hoisting mechanism may suitably be located on the platform 11 or may be separate therefrom.

Riser 22 is supported by elevator system 53 which is operably connected to the hoisting device 15 shown in FIG. 1.

The pipeline 19 is guidingly moved down the advance guide system 43 on movement of the cable car 48 by means of power either carried on the cable car 48 or through power means located on the platform 11. It will be noted that the pipeline 19 advances the distance S, which is equal to the slack which is to be compensated for at a given depth of water. As the pipeline 19 moves to the left, the free end 20 approaches the free end 25 of the pipeline riser 22, which has been positioned in the sleeves 41.

The free end 20 of pipeline 19 is positioned below and aligned with the free end 25 of riser 22. The pipeline is adjusted vertically by means of line 46 and reel 47 until the hooks 52 are positioned in the sleeves 42 as shown in dotted lines in FIG. 10. The riser 22 is then lowered and connection is made between the riser and the pipeline. The hoisting mechanism 15 may provide power for moving the cable car on track 49 or the power may be provided on the cable car itself.

Referring to FIG. 12, which is similar to FIG. 10, it will be noted that the guide sleeves 41 and the hook receiver sleeves 42 are positioned on a guide rail 17 by means of slide brackets. One continuous bracket may be employed or, if desired, separate brackets may be used with spacer brackets between to provide the correct spacing between components. The operation of the device of FIG. 12 is the same as that of FIG. 10.

Figure 13:
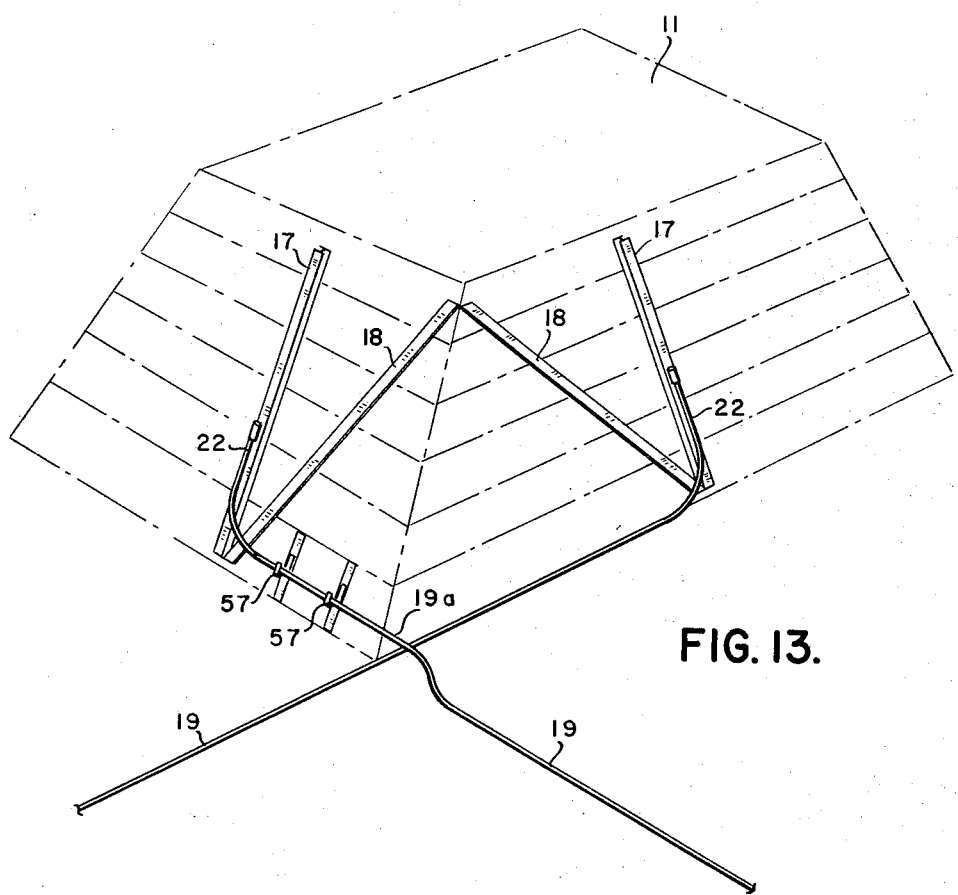
FIG. 13 illustrates an arrangement where multiple pipelines are located on a platform.

FIG. 13 illustrates a platform 11 provided with a plurality of pipelines 19 connected to pipeline risers 22. In this particular instance it will be noted that the guide means or tracks 17 and 18 are provided similar to the other embodiments. In this particular instance one of the pipelines 19 may be supported above the other of the pipelines 19 by means of saddle support 57 which carries the portion 19a above the run of the other pipelines 19.

Figure 14:
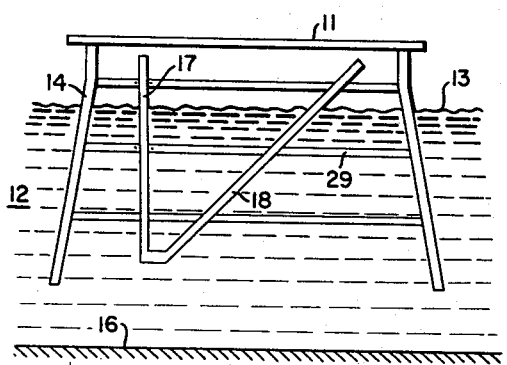
FIG. 14 is a view of an offshore platform similar to FIG. 1 in floating position.

FIG. 14 illustrates a platform 11 such as described in FIGS. 1 and 2 in floating position with the lower ends of support members 14 above water bottom 16. In this embodiment, the platform 11 may be one of the seadrome type and may be provided with well known floats or buoyancy means which may be attached to the support members 14 such as at the lower ends thereof. The embodiment of FIG. 4 may be anchored or positioned as desired in floating position at a particular location.

In practicing the present invention with reference to the mode and embodiment of FIGS. 1-5 and 7-9, and 14 a pipeline such as 19 is guidingly lowered on guide member 18. The pipeline riser 22 may be lowered on guide member 17 before, after, or during the time pipeline 19 is being lowered. It will be preferred however, to lower pipeline riser 22 after pipeline 19 is positioned.

When pipeline riser 22 is lowered, as a section of it is moved down on guide member 17, sections of pipe are connected to the upper end until the lower end is adjacent the free end 20 of pipeline 19 for connection thereto. Thereafter, the upper end of pipeline riser 22 may then be connected on the platform 11 or adjacent thereto to one or more wells extending to the platform 11, or the pipeline riser may be connected to storage facilities on the platform 11 or to storage facilities on shore or remote from the platform 11.

Similarly, once connection is made, fluid may be flowed through the pipeline 19 and riser 22 as may be desired. This fluid may be oil or gas or other fluids or suspensions, slurries, etc., which may be flowed through pipelines.

The mode and embodiment of FIG. 6 operate similarly to the mode and embodiment described except in this instance the casing 34 moves downwardly carried by slides 23, with additional length being added to the casing 34 and riser 22 as desired and necessary as both are lowered to a point adjacent the free end 20 of the pipeline 19 for connection thereto.

With respect to FIGS. 10-12, the pipeline 19 is supported by sling 50 as the pipeline 19 is moved laterally and guidingly lowered with yoke 45 as has been described. Once the hook receivers 42 and hooks 52 engage, the pipeline riser 42 is lowered by elevators 53 by adding sections of pipe to the upper end of riser 22 until the lower end is in position to engage and connect with the free end 20 of pipeline 19. As with the other modes and embodiments, the pipeline 19 and riser 22 may be lowered together or either one before the other, or the riser 22 may be lowered first and the pipeline 19 second, or vice versa.

The mode and embodiment of FIG. 13 is operated similarly to the other modes and embodiments. In this instance two pipelines 19 are shown. A larger number may be provided as necessary, limited only by the size of the platform 11.

The present invention is quite important and useful in that by battering the launching rail or guide system of the pipeline and pipeline riser on a platform, the advance of the pipeline, which would ordinarily be slack in the pipeline as it is lowered into deep water, is compensated for.

Likewise, there has been provided a system where the pipeline is moved laterally as it is being lowered. As shown in the several embodiments, compensation is made for the slack which ordinarily would result from laying pipelines in deep water.

The nature and objects of the present invention having been completely described and illustrated and the best mode and embodiment thereof set forth, what I wish to claim as new and useful and secure by Letters Patent is:

1. A method for installing an underwater pipeline on a support arranged at least at water level in deep water which comprises lowering to a selected point in said water from said support in a first direction a pipeline carried from water surface having a free and extending to a point at least adjacent said support, lowering substantially vertically in said water from said support a pipeline riser having a lower free end in a second direction until its lower free end is adjacent the free end of said pipeline, said first and second directions converging at a common point at least when extended, and thereafter connecting said free ends to form a passageway for fluid through said pipeline riser and pipeline, thereby compensating for any slack in said pipeline resulting from lowering said pipeline in said body of water.

2. A method in accordance with claim 1 in which the support is fixedly arranged in said body of water.

3. A method in accordance with claim 1 in which the support is floatingly arranged in said body of water.

4. A method in accordance with claim 1 in which the free ends are at least adjacent water bottom when the free ends are connected.

5. A method in accordance with claim 1 in which the free ends are above water bottom when the free ends are connected.

6. A method in accordance with claim 1 in which the support is a platform.

7. A method in accordance with claim 1 in which said pipeline is supported at a point removed from its free end while it is being lowered.

8. A method in accordance with claim 1 in which the pipeline is guidingly moved in said first direction as it is being lowered and said pipeline riser is guidingly lowered.

9. Apparatus for installing a pipeline on a support in deep water which comprises, in combination, a support member arranged in deep water, a pipeline extending with a free end to a point at least adjacent said support member, first means on said support member for guidingly lowering said pipeline in said water in a first direction, second means on said support member for guidingly lowering a pipeline riser having a free lower end from said support member in a second direction, said first and second lowering means being arranged to such that when said pipeline and riser are lowered thereon the free ends converge at a common point at least when the directions thereof are extended, and means for connecting the free ends of said pipeline and pipeline riser.

10. Apparatus in accordance with claim 9 in which the support is fixedly arranged in said body of water.

11. Apparatus in accordance with claim 9 in which the support is floatingly arranged in said body of water.

12. Apparatus in accordance with claim 9 in which the first and second lowering means comprise guide means.

13. Apparatus in accordance with claim 12 in which the first and second guide means are rails extending in said first and second directions.

References Cited
UNITED STATES PATENTS

| | | | |
|---|---|---|---|
| Re. 23,963 | 3/1955 | Collins | 61—72.4 |
| 1,363,115 | 12/1920 | Helfrich | 61—72.3 X |
| 1,647,448 | 11/1927 | Jones | 61—72.4 X |
| 3,211,223 | 10/1965 | Hoch | 166—0.6 |
| 3,226,728 | 12/1965 | Walvoord | 166—0.5 |
| 3,233,666 | 2/1966 | Geer et al. | 166—0.5 |
| 3,258,928 | 7/1966 | Broadway et al. | 166—0.5 X |
| 3,298,092 | 1/1967 | Dozier et al. | 61—72.3 X |
| 3,299,950 | 1/1967 | Shatto | 166—0.5 |
| 3,308,881 | 3/1967 | Chan et al. | 166—0.6 |
| 3,322,193 | 5/1967 | Word | 166—0.6 |

ERNEST R. PURSER, *Primary Examiner.*

CHARLES E. O'CONNELL, *Examiner.*

IAN A. CALVERT, *Assistant Examiner.*